(12) United States Patent
Aizawa

(10) Patent No.: US 7,657,902 B2
(45) Date of Patent: Feb. 2, 2010

(54) DISK HOLDING DEVICE AND DISK RECORDING/REPRODUCTION APPARATUS

(75) Inventor: Hidekuni Aizawa, Kanagawa (JP)

(73) Assignee: Sony Corporation (JP)

( * ) Notice: Subject to any disclaimer, the term of this patent is extended or adjusted under 35 U.S.C. 154(b) by 518 days.

(21) Appl. No.: 11/712,244

(22) Filed: Feb. 28, 2007

(65) Prior Publication Data

US 2007/0217065 A1    Sep. 20, 2007

(30) Foreign Application Priority Data

Mar. 1, 2006    (JP)    ............................. P2006-054656

(51) Int. Cl.
*G11B 17/028*    (2006.01)

(52) U.S. Cl. .................................... 720/706

(58) Field of Classification Search ................ 720/706, 720/707, 713, 702, 712, 704, 723, 652, 604, 720/696, 625, 611, 632; 360/99.12, 99.07, 360/99.06, 99.08
See application file for complete search history.

(56) References Cited

U.S. PATENT DOCUMENTS 6,249,500 B1 * 6/2001 Kanazawa et al. .......... 720/645

6,650,603 B2 * 11/2003 Michimori et al. ......... 369/30.82
6,954,935 B2 * 10/2005 Niikura et al. .............. 720/604

FOREIGN PATENT DOCUMENTS

| JP | 60-239961 A | 11/1985 |
|---|---|---|
| JP | 7-192368 A | 7/1995 |
| JP | 9-320158 A | 12/1997 |
| JP | 2000-167500 A | 6/2000 |
| JP | 2001-126369 A | 5/2001 |
| JP | 2003-257084 A | 9/2003 |

* cited by examiner

*Primary Examiner*—Allen T Cao
(74) *Attorney, Agent, or Firm*—Lerner, David, Littenberg, Krumholz & Mentlik, LLP

(57) ABSTRACT

This invention provides a disk holding device which may include a plurality of disk holding members and a disk receiving part. The disk holding members may each be provided with a holding projection part projected from the inner periphery side toward the outer periphery side of the disk-formed recording medium; the holding projection part may be provided with an inclined surface displaced so as to be spaced away from the disk-formed recording medium as one goes from the inner periphery side toward the outer periphery side of the disk-formed recording medium in the condition where the disk holding members are inserted in the center hole.

4 Claims, 17 Drawing Sheets

DISK HOLDING DEVICE AND DISK RECORDING/REPRODUCTION APPARATUS

CROSS-REFERENCE TO RELATED APPLICATIONS

This application claims priority from Japanese Patent Application No. JP 2006-054656, filed in the Japanese Patent Office on Mar. 1, 2006, the entire content of which is incorporated herein by reference.

BACKGROUND OF THE INVENTION

1. Field of the Invention

The present invention relates to the technological field concerning a disk holding device and a disk recording/reproduction apparatus. More particularly, the invention relates to the technological field in which a plurality of disk holding members having inclined surfaces inclined against the recording surface of a disk-formed recording medium so as, for example, to prevent the damaging of the inner peripheral surface of the disk-formed recording medium.

2. Description of the Related Art

As the disk-formed recording medium, there have been widely used disk-formed recording media of various types, such as optical disk, magneto-optical disk, and magnetic disk.

In general, a disk-formed recording medium is mounted on a turntable in the condition where a centering projection part of the turntable is inserted in a center hole formed in a central part of the disk-formed recording medium, and it is rotated according to the rotation of the turntable by the rotation of a spindle motor.

Such a disk-formed recording medium is used on a disk recording/reproduction apparatus for performing recording and/or reproduction of information signals on the disk-formed recording medium, and recording and/or reproduction of information signals is conducted.

Examples of the disk recording/reproduction apparatus include various apparatuses such as disk drives provided, for example, in disk reproduction apparatuses, disk recorders, disk changers, personal computers, etc. These apparatuses include those in which a disk holding device for holding a disk-formed recording medium and mounting the disk-formed recording medium in a predetermined position (refer to Japanese Patent Laid-open No. 2001-167500 as Patent Document 1).

For example, in a disk changer, a desired one of a plurality of disk-formed recording media stored in a stocker is held by a disk holding device and taken out, and the disk-formed recording medium thus taken out is transferred by the disk holding device and is mounted on a turntable of a disk drive.

Various types of disk holding devices are present, including the type in which a holding projection part is inserted into the center hole of a disk-formed recording medium to thereby hold the disk-formed recording medium.

SUMMARY OF THE INVENTION

Meanwhile, the center hole of the disk-formed recording medium is an important part for maintaining a good accuracy of centering of the disk-formed recording medium relative to the centering projection part of a turntable.

However, in the above-mentioned disk holding device according to the related art, the holding projection part is inserted into and fitted in the center hole of the disk-formed recording medium, so that at the time of insertion of the holding projection part, the holding projection part may make sliding contact with the inner peripheral surface of the disk-formed recording medium, leading to marring, wear, damage or the like of the inner peripheral surface of the disk-formed recording medium. Therefore, where the marring or the like is generated, it becomes impossible to maintain a good accuracy of centering of the disk-formed recording medium relative to the centering projection part.

Thus, there is a need for a disk holding device and a disk recording/reproduction apparatus in which the above-mentioned problem can be overcome, i.e., the marring or the like of the disk-formed recording medium can be prevented.

In order to solve the above-mentioned problem, in a disk holding device and a disk recording/reproduction apparatus according to embodiments of the present invention, a plurality of disk holding members to be inserted into a center hole of a disk-formed recording medium and be moved from the inner periphery side toward the outer periphery side of the disk-formed recording medium when inserted in the center hole, and a disk receiving part for receiving a part, on the outer side of the center hole, of an inner peripheral part of the disk-formed recording medium, may be provided; the disk holding members may each be provided with a holding projection part projected from the inner periphery side toward the outer periphery side of the disk-formed recording medium; the holding projection part may be provided with an inclined surface displaced so as to be spaced away from the disk-formed recording medium as one goes from the inner periphery side toward the outer periphery side of the disk-formed recording medium in the condition where the disk holding members are inserted in the center hole; and when the disk holding members are moved from the inner periphery side toward the outer periphery side of the disk-formed recording medium, the inclined surfaces of the holding projection parts may make sliding contact with an aperture edge of the center hole to move the disk-formed recording medium in the direction of approaching the disk receiving part, whereby the disk-formed recording medium may be held in the state of being clamped between the disk receiving part and the plurality of holding projection parts.

Therefore, in the disk holding device and the disk recording/reproduction apparatus according to embodiments of the present invention, the disk-formed recording medium may be held in the condition where the inclined surfaces of the holding projection parts are in contact with the aperture edge of the center hole.

Specifically, according to one embodiment of the present invention, there is provided a disk holding device which may include a plurality of disk holding members to be inserted into a center hole of a disk-formed recording medium and be moved from the inner periphery side toward the outer periphery side of the disk-formed recording medium when inserted in the center hole; and a disk receiving part for receiving a part, on the outer side of the center hole, of an inner peripheral part of the disk-formed recording medium, wherein the disk holding members may each be provided with a holding projection part projected from the inner periphery side toward the outer periphery side of the disk-formed recording medium; the holding projection part is provided with an inclined surface displaced so as to be spaced away from the disk-formed recording medium as one goes from the inner periphery side toward the outer periphery side of the disk-formed recording medium in the condition where the disk holding members are inserted in the center hole; and when the disk holding members are moved from the inner periphery side toward the outer periphery side of the disk-formed recording medium, the inclined surfaces of the holding projection parts may make sliding contact with an aperture edge of the center hole to move the disk-formed recording medium in the direction of approaching the disk receiving part, whereby the disk-formed recording medium is held in the state of being clamped between the disk receiving part and the plurality of holding projection parts.

Therefore, since the disk holding members may make contact with the aperture edge of the center hole to thereby hold the disk-formed recording medium and no member may make contact with the inner peripheral surface of the disk-formed recording medium, it is possible to prevent the marring, wear, damage or the like of the inner peripheral surface of the disk-formed recording medium.

According to another embodiment of the present invention, there is provided a disk holding device pertaining to the one embodiment of the invention, wherein a base body having the disk receiving part, and a cam member rotatably supported on the base body and having a plurality of cam grooves, may be provided; the disk holding members may each be provided with a cam shaft slidably engaged in the cam groove; the disk holding members are turnably supported on the base body; and the relationship of $h \geq (a/\tan \theta) \cdot (L2/L1)$ may be established, where L1 is the distance from the center of turning of the disk holding member relative to the base body to the holding projection part along the direction orthogonal to the axial direction of the axis of turning of the disk holding member relative to the base body, L2 is the distance from the center of turning of the disk holding member relative to the base body to the center of the cam shaft along the direction orthogonal to the axial direction of the axis of turning of the disk holding member relative to the base body, a is the difference between a maximum size and a minimum size of thickness based on dispersion of the thickness of the disk-formed recording media, θ is the inclination angle of the inclined surface of the holding projection part against a recording surface of the disk-formed recording medium, and h is the gap between the cam shaft and the cam groove in the width direction of the cam groove. Therefore, all the disk-formed recording media can be assuredly held by the inclined surfaces of the disk holding members and the disk receiving part according to the differences in thickness among the disk-formed recording media, without applying any unnecessary load.

According to a further embodiment of the present invention, there is provided a disk holding device pertaining to the one embodiment of the invention, wherein a base body having the disk receiving part, and a cam member rotatably supported on the base body and having a plurality of cam grooves, may be provided; the disk holding members may each be provided with a cam shaft slidably engaged in the cam groove; the disk holding members are turnably supported on the base body; and bias springs for urging the cam shafts toward the outer edge side of the cam grooves may be provided. Therefore, whenever the cam member is rotated, the cam shafts may each be moved in the state of making contact with one-side edge of the cam groove. Accordingly, the cam shafts may each be prevented from moving inside the cam groove in the width direction of the cam groove, whereby stabilization of the movement of the disk holding members is promised.

According to yet another embodiment of the present invention, there is provided a disk recording/reproduction apparatus which may include a disk holding device for holding a disk-formed recording medium and operative to perform recording and/or reproduction of information signals on the disk-formed recording medium, the disk holding device including: a plurality of disk holding members to be inserted into a center hole of a disk-formed recording medium and be moved from the inner periphery side toward the outer periphery side of the disk-formed recording medium when inserted in the center hole; and a disk receiving part for receiving a part, on the outer side of the center hole, of an inner peripheral part of the disk-formed recording medium, wherein the disk holding members are each provided with a holding projection part projected from the inner periphery side toward the outer periphery side of the disk-formed recording medium; the holding projection part is provided with an inclined surface displaced so as to be spaced away from the disk-formed recording medium as one goes from the inner periphery side toward the outer periphery side of the disk-formed recording medium in the condition where the disk holding members are inserted in the center hole; and when the disk holding members are moved from the inner periphery side toward the outer periphery side of the disk-formed recording medium, the inclined surfaces of the holding projection parts make sliding contact with an aperture edge of the center hole to move the disk-formed recording medium in the direction of approaching the disk receiving part, whereby the disk-formed recording medium is held in the state of being clamped between the disk receiving part and the plurality of holding projection parts.

Therefore, since the disk holding members may make contact with the aperture edge of the center hole to thereby hold the disk-formed recording medium and no member may make contact with the inner peripheral surface of the disk-formed recording medium, it is possible to prevent the marring, wear, damage or the like of the inner peripheral surface of the disk-formed recording medium.

DETAILED DESCRIPTION

Now, a best mode for carrying out the disk holding device and the disk recording/reproduction apparatus pertaining to the present invention will be described below referring to the accompanying drawings. The following best mode is a mode in which the disk recording/reproduction apparatus according to an embodiment of the present invention is applied to a disk changer and the disk holding device according to an embodiment of the invention is applied to a disk holding device provided in the disk changer.

Incidentally, the scope of application of the present invention is not limited to the disk changer or the disk holding device used in the disk changer, and can be widely applied to various disk recording/reproduction apparatuses for performing recording and/or reproduction of information signals on various disk-formed recording media such as optical disk, magneto-optical disk, magnetic disk, etc. or to disk holding devices used in the disk recording/reproduction apparatuses.

Figure 1:
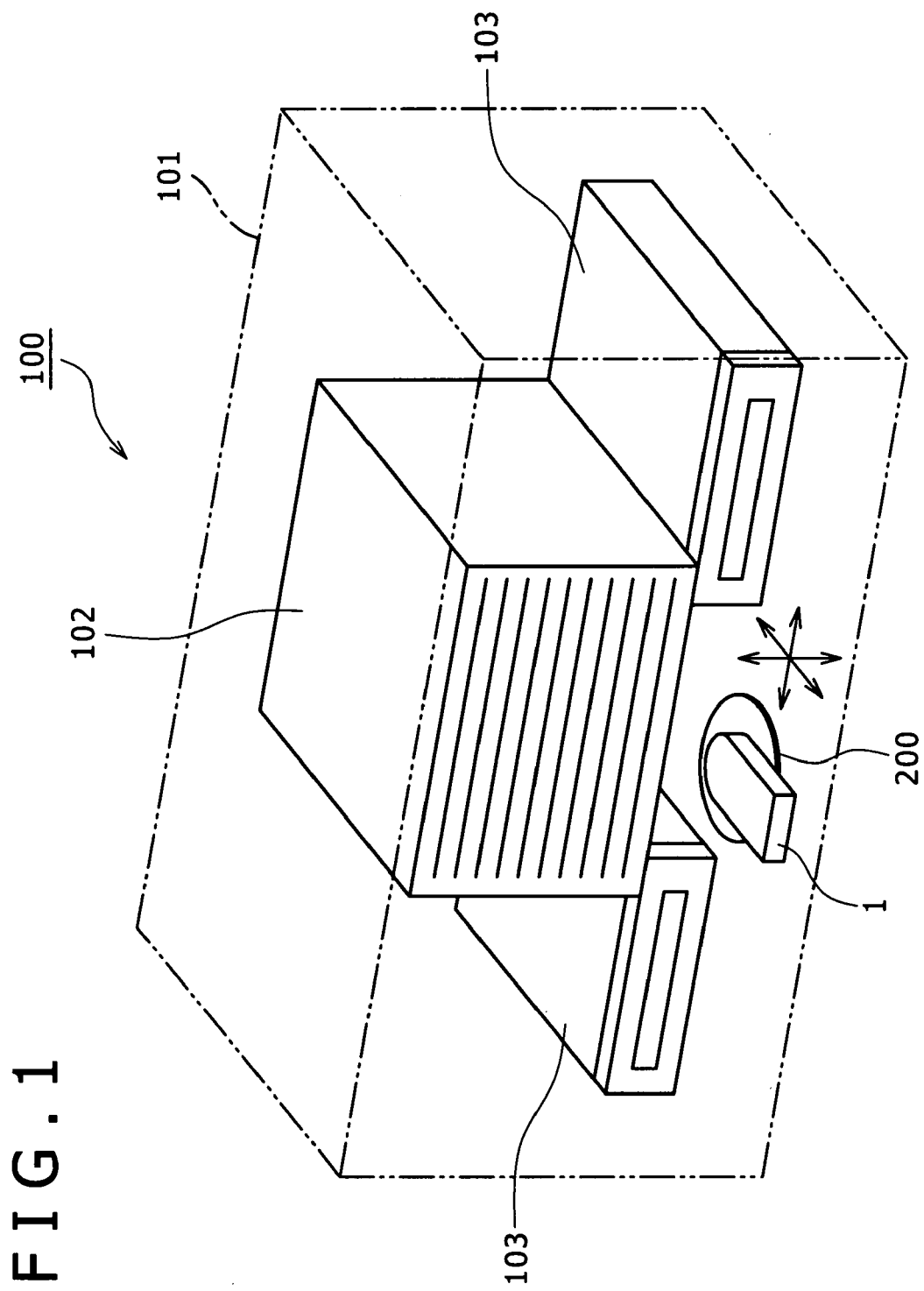
FIG. 1 shows, together with FIGS. 2 to 18, a best mode for carrying out the present invention, and is a general perspective view of a disk changer.

As shown in FIG. 1, the disk changer (disk recording/reproduction apparatus) has required parts disposed in a housing 101; specifically, a stocker 102, disk drives 103, 103, and a disk holding device 1 are disposed on the housing 101.

The stocker 102 is provided with a plurality of storing parts, in which disk-formed recording media 200 can be stored individually.

The disk drives 103, 103 are, for example, disposed in the state of being separated to the left and right side from each other on the lower side of the stocker 102, and are each provided with a disk tray on which to mount the disk-formed recording medium 200.

In the condition where the disk tray has been drawn out through a front face of the disk drive 103, the disk-formed recording medium 200 is mounted on the disk tray by the disk holding device 1. Besides, in the condition where the disk tray with the disk-formed recording medium 200 mounted thereon has been drawn into the disk drive 103, the disk-formed recording medium 200 is mounted on a turntable (not shown), and recording or reproduction of information signals on the disk-formed recording medium 200 is performed.

When the recording or reproduction of information signals on the disk-formed recording medium 200 is finished, the disk tray is drawn out through the front face of the disk drive 103, and the disk-formed recording medium 200 is taken out of the disk tray and is held. When the disk-formed recording medium 200 is taken out from the disk tray by the disk holding device 1, the disk tray is again drawn into the disk drive 103.

The disk holding device 1 is so configured, for example, that it can be moved in three axial directions, i.e., the vertical direction, the front-rear direction and the left-right direction, on the front side of the stocker 102 and the disk drives 103, 103.

Figure 2:
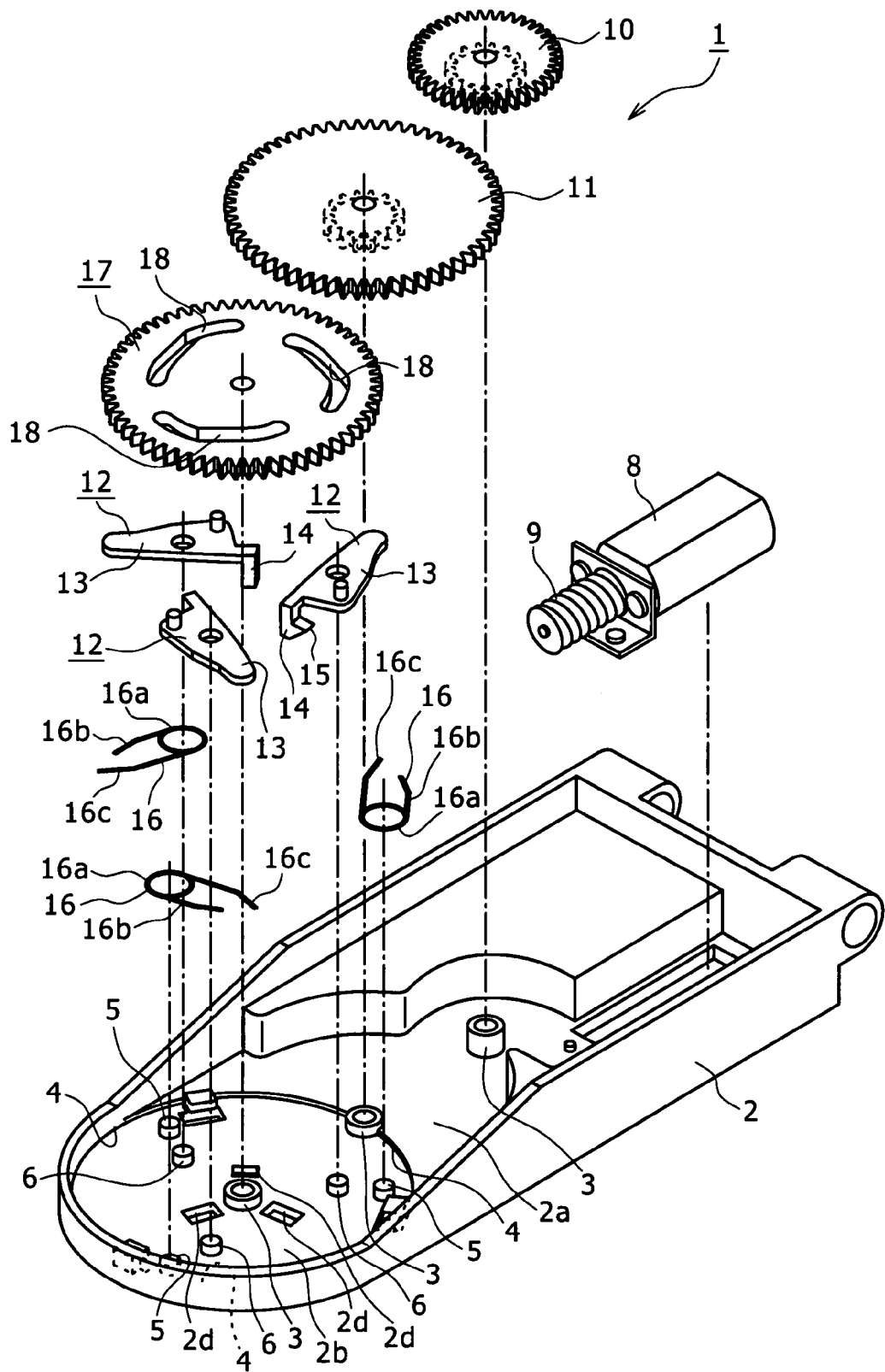
FIG. 2 is an exploded perspective view of a disk holding device.
Figure 3:
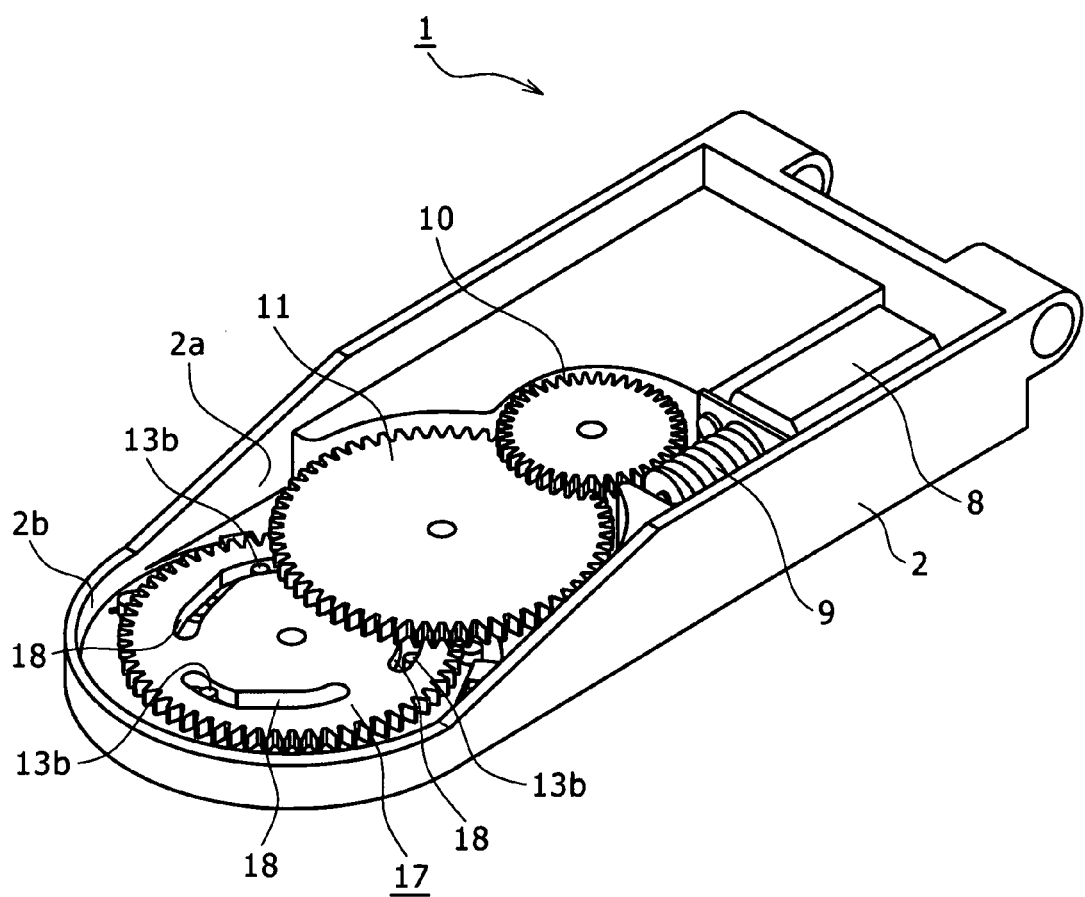
FIG. 3 is a perspective view of the disk holding device.

The disk holding device 1 has a base body 2 (see FIGS. 2 and 3). The base body 2 is formed, for example, in a shape elongate in the front-rear direction and flat in the vertical direction, and is provided with an arranging recess part 2a opened to the upper side. Of the arranging recess part 2a, a part on the rear end side is formed as a main arranging part 2b which is lower by one step than the other part.

As shown in FIG. 2, the arranging recess part 2a is provided with gear support projection parts 3, 3, 3 spaced from each other along the front-rear direction, and the gear support projection part 3 located on the rearmost side is provided at a roughly central portion of the main arranging part 2b.

The main arranging part 2b is provided with spring receiving wall parts 4, 4, 4 which are spaced at regular intervals along the circumferential direction and which face to the gear support projection part 3 side. Spring support shafts 5, 5, 5 and spring support shafts 6, 6, 6 are provided at positions on the inner side of the spring receiving wall parts 4, 4, 4. The spring support shafts 5, 5, 5 and the spring support shafts 6, 6, 6 are located at intervals along the circumferential direction, and the spring support shafts 5, 5, 5 are located on the outer side of the spring support shafts 6, 6, 6.

Figure 4:
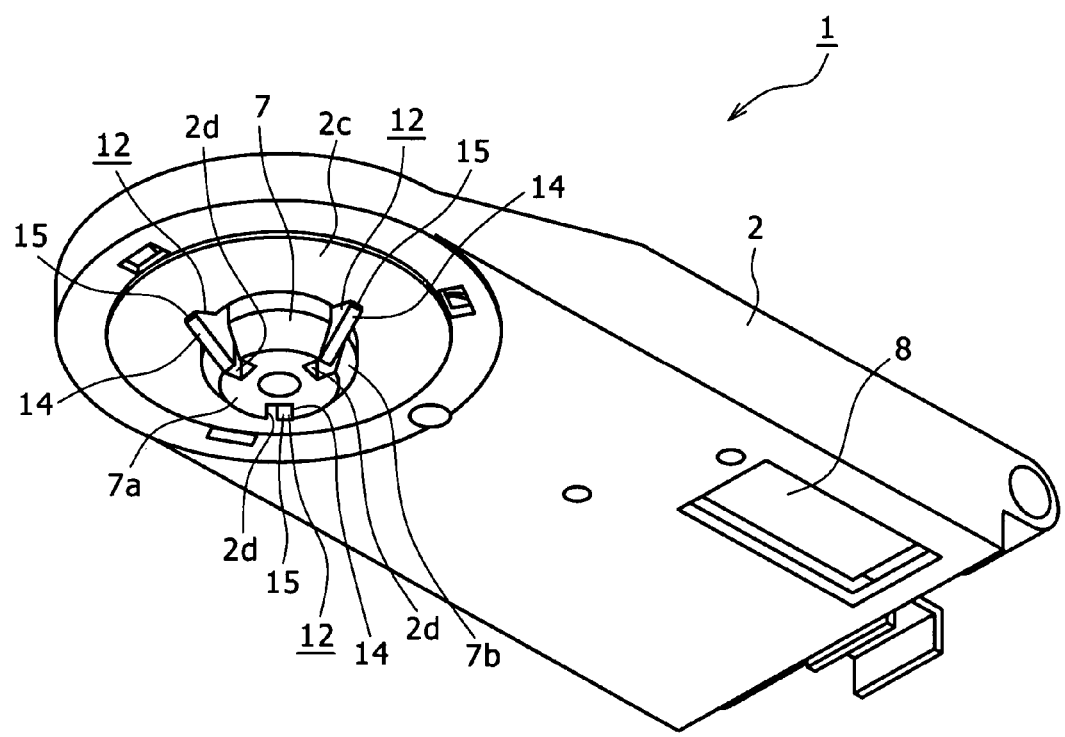
FIG. 4 is a perspective view showing the lower surface side of the disk holding device.
Figure 5:
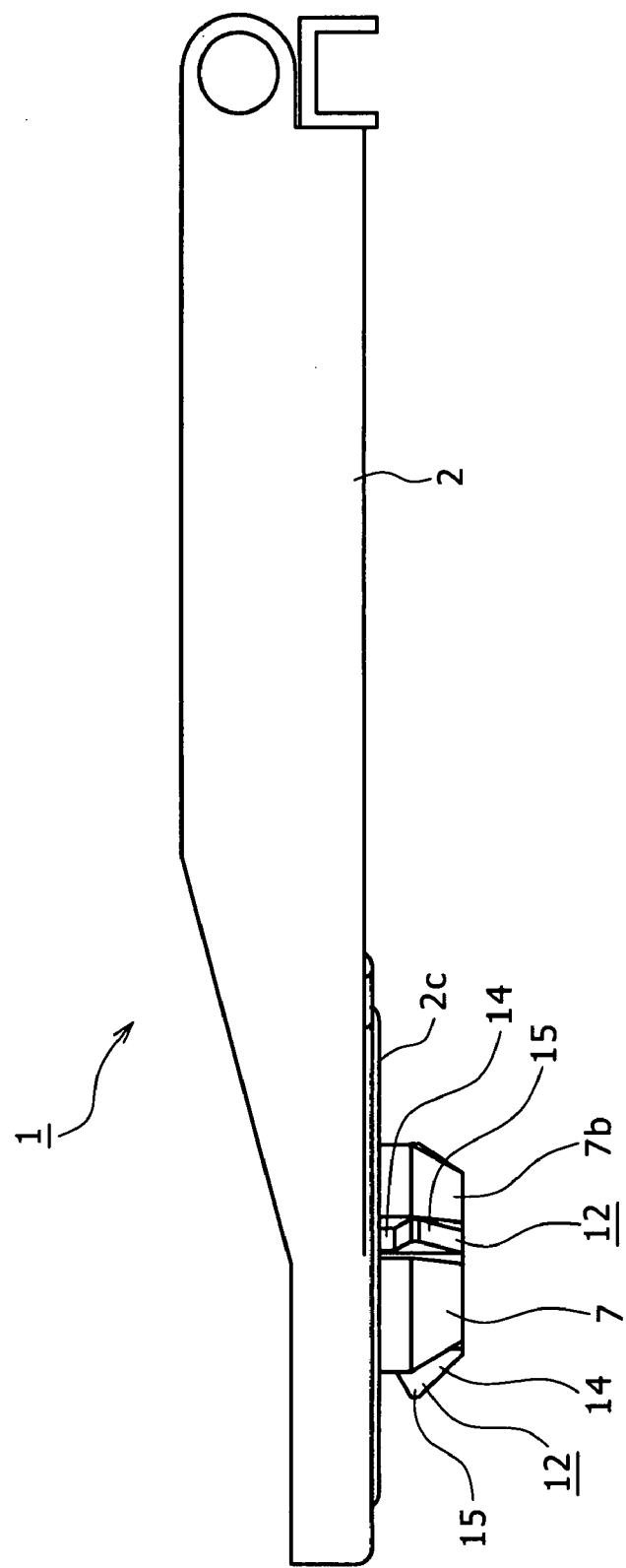
FIG. 5 is a side view showing the disk holding device.

At a rear end part of the base body 2, an inserted projection part 7 projected to the lower side is provided (see FIGS. 4 and 5). The inserted projection part 7 has a maximum outside diameter which is slightly smaller than the diameter of a center hole 200a of the disk-formed recording medium 200. The inserted projection part 7 has a circular lower surface 7a and a peripheral surface 7b, and the part exclusive of an upper end part of the peripheral surface 7b is so inclined as to be displaced inwards as one goes downwards.

The base body 2 is provided, in the periphery of the inserted projection part 7, with an annular disk receiving part 2c which is projected to the lower side. The lower surface of the disk receiving part 2c is formed to be flat.

The base body 2 is provided, in the periphery of the gear support shaft part 3 located on the rearmost side, with insertion holes 2d, 2d, 2d spaced at regular intervals in the circumferential direction (see FIG. 2). The insertion holes 2d, 2d, 2d are formed to penetrate the inserted projection part 7 (see FIG. 4).

A drive motor 8 is disposed at a front end part of the arranging recess part 2a (see FIGS. 2 and 3). A worm 9 is fixed to a motor shaft of the motor 8.

Speed reduction gears 10, 11 are rotatably supported on the two gear support projection parts 3, 3 located on the front side. The speed reduction gears 10, 11 are both double gears, and are meshed with each other. The speed reduction gear 10 located on the front side is meshed with the worm 9 fixed to the drive motor 8.

Figure 6:
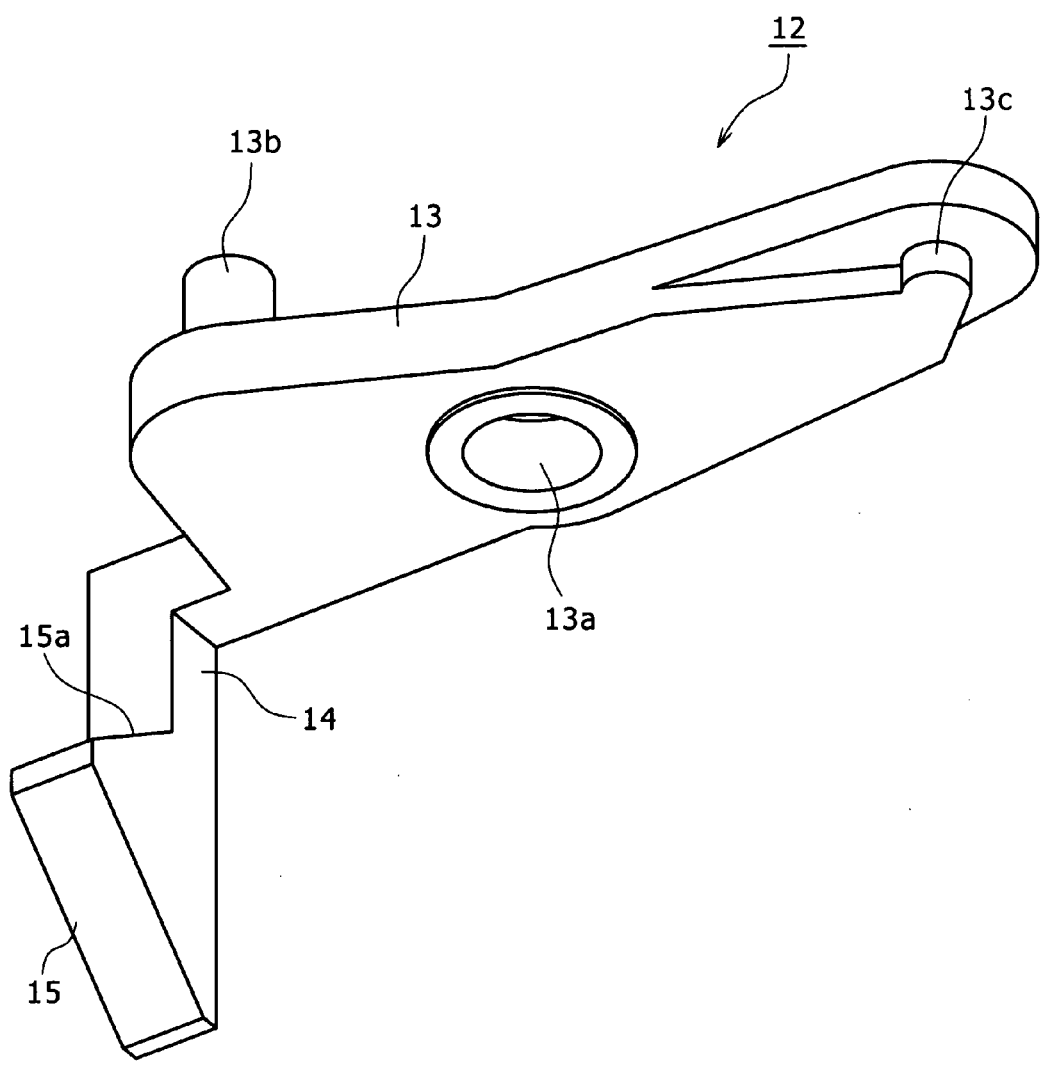
FIG. 6 is an enlarged perspective view of a disk holding member.

A part of each of disk holding members 12, 12, 12 is inserted, from the upper side, in each of the insertion holes 2d, 2d, 2d formed in the base body 2. The disk holding member 12 has a configuration in which, as shown in FIGS. 3 and 6, a supported part 13 extending in a horizontal direction and a holding projection part 14 projected to the lower side from one end part in the longitudinal direction of the supported part 13 are formed as one body with each other.

The supported part 13 is provided with a supported hole 13a in a substantially central part thereof. The supported part 13 is provided, at one end part in the axial direction thereof, with a cam shaft 13b projected to the upper side. The other end part in the longitudinal direction of the supported part 13 is provided with a spring receiving part 13c on the lower surface side thereof.

The holding projection part 14 is provided at a lower end portion thereof with a projection part 15 projected outwards. The projection part 15 is formed in a substantially triangular shape protuberant to the outer side, and has an inclined surface 15a displaced outwards as one goes downwards.

The spring support shafts 6, 6, 6 possessed by the base body 2 are inserted respectively in the supported holes 13*a*, 13*a*, 13*a* of the disk holding members 12, 12, 12, and the disk holding members 12, 12, 12 are supported on the base body 2 so as to be turnable with the spring support shafts 6, 6, 6 as fulcrums.

Bias springs 16, 16, 16 are supported on the base body 2 (see FIG. 2). The bias spring 16 is, for example, a torsion coil spring 16, of which a coil part 16*a* is supported by the spring support shaft 5 of the base body 2, one end part 16*b* is engaged with the spring receiving wall part 4 of the base body 2, and the other end part 16*c* is engaged with the spring receiving part 13*c* of the disk holding member 12. By the bias springs 16, 16, 16, the disk holding members 12, 12, 12 are urged counterclockwise as viewed from the upper side, i.e., urged in such directions that the cam shafts 13*b*, 13*b*, 13*b* approach the spring receiving wall parts 4, 4, 4, respectively.

A cam member (cam gear) 17 is rotatably supported on the gear support projection part 3 located on the rearmost side of the base body 2 (see FIGS. 2 and 3). The cam member 17 is located on the upper side of the disk holding members 12, 12, 12, and has cam grooves 18, 18, 18 spaced along the circumferential direction. The cam groove 18 is formed to have a fixed width, and, as shown in FIG. 7, the cam groove 18 includes an inside non-displaced part 18*a* located on the innermost side and having a short arcuate shape, a displaced part 18*b* continuous with the inside non-displaced part 18*a* and displaced outwards as one goes away from the inside non-displaced part 18*a*, and an outside non-displaced part 18*c* continuous with the displaced part 18*b* and having a short arcuate shape.

The cam member 17 is meshed with the speed reduction gear 11 (see FIGS. 2 and 3). Therefore, when the drive motor 8 is rotated, its driving force is transmitted through the worm 9 and the speed reduction gears 10, 11 to the cam member 17, so that the cam member 17 is rotated in a direction according to the rotating direction of the drive motor 8.

The cam shafts 13*b*, 13*b*, 13*b* of the disk holding members 12, 12, 12 are slidably engaged respectively with the cam grooves 18, 18, 18 of the cam member 17. With the cam member 17 rotated, the positions of the cam shafts 13*b*, 13*b*, 13*b* relative to the cam grooves 18, 18, 18 are changed, and the disk holding members 12, 12, 12 are turned in directions according to the rotating direction of the cam member 17, with the spring support shafts 6, 6, 6 as respective fulcrums.

Figure 7:
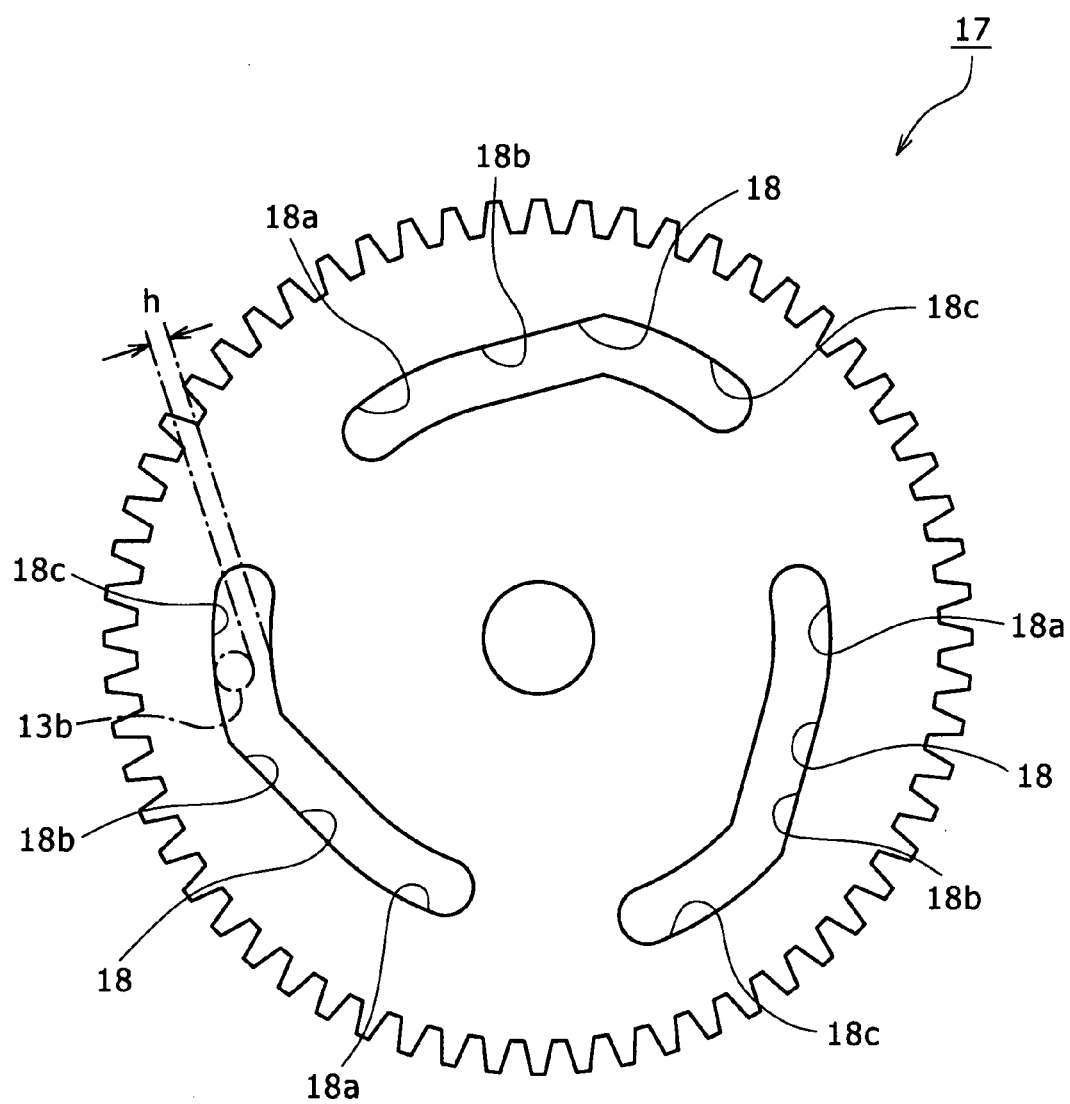
FIG. 7 is an enlarged plan view of a cam member.

A gap h which is constant in the width direction of each of the cam grooves 18, 18, 18 of the cam member 17 is formed between each of the cam grooves 18, 18, 18 and each of the cam shafts 13*b*, 13*b*, 13*b* of the disk holding members 12, 12, 12 (see FIG. 7). Since the disk holding members 12, 12, 12 are urged counterclockwise as viewed from above by the bias springs 16, 16, 16, respectively, the cam shafts 13*b*, 13*b*, 13*b* are kept in contact with the outer edges of the cam grooves 18, 18, 18, respectively.

The disk holding device 1 configured as above is movably supported on a support mechanism (not shown), and can be moved in three directions, i.e., the vertical direction, the front-rear direction and the left-right direction. The disk holding device 1 is provided with a sensor (not shown), by which, for example, the rotational position or rotational angle of the cam member 17 is detected. When the rotational position or rotational angle of the cam member 17 is detected, the detection result is outputted to a control circuit (not shown), and, based on the detection result thus outputted, a control signal is outputted from the control circuit to the drive motor 8, whereby the operation of the drive motor 8 is controlled.

Now, the holding operation applied to the disk-formed recording medium 200 by the disk holding device 1 will be described below (see FIGS. 8 to 16).

Figure 8:
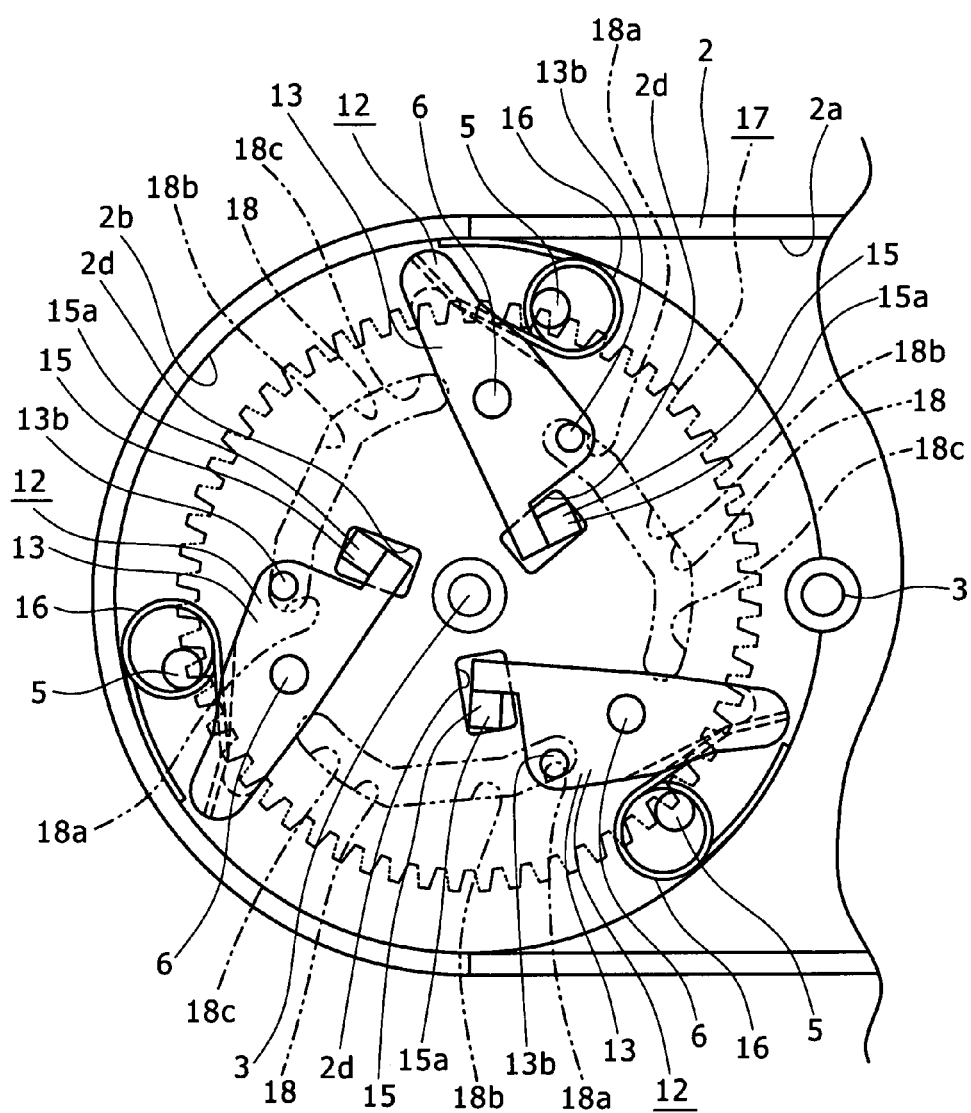
FIG. 8 shows, together with FIGS. 9 to 16, the operations of the disk holding device, and is an enlarged plan view showing the condition before the disk holding members are moved outwards.
Figure 9:
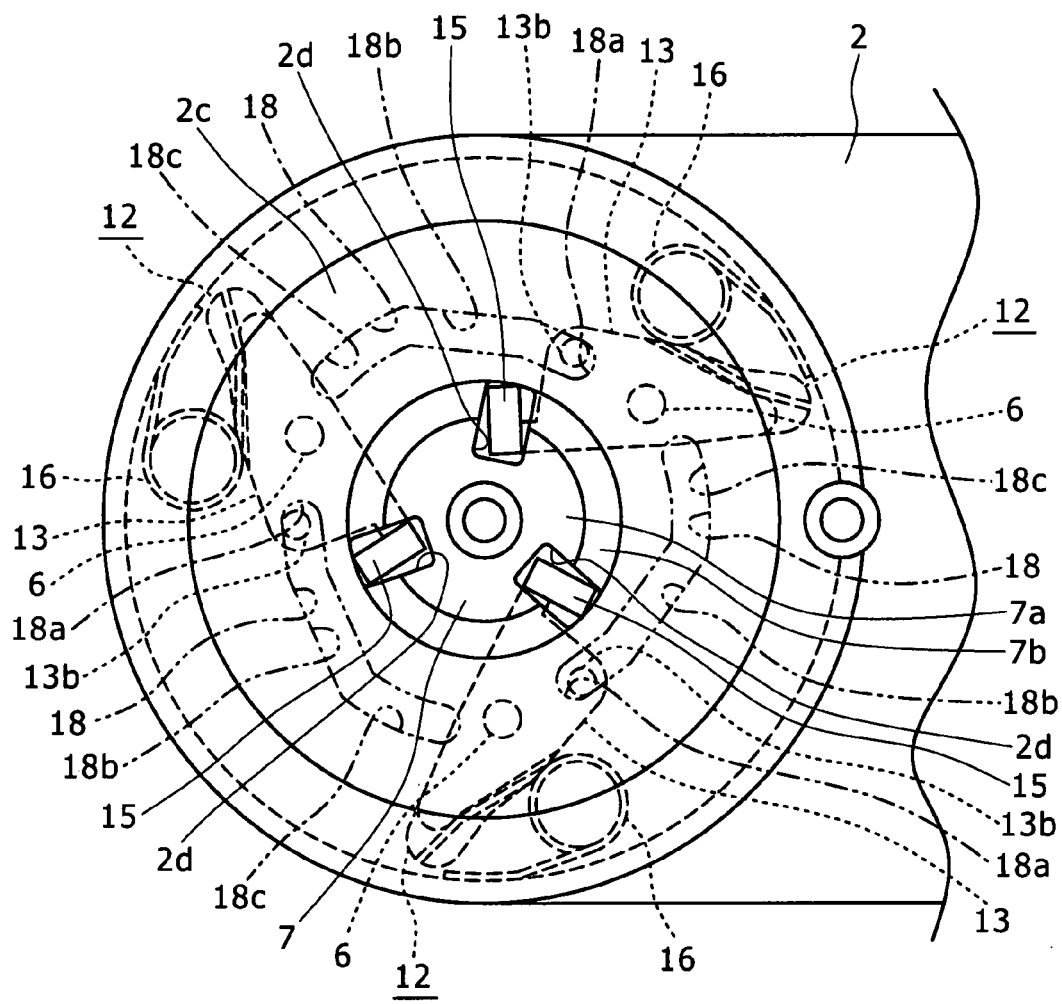
FIG. 9 is an enlarged bottom view showing the condition before the disk holding members are moved outwards.
Figure 10:
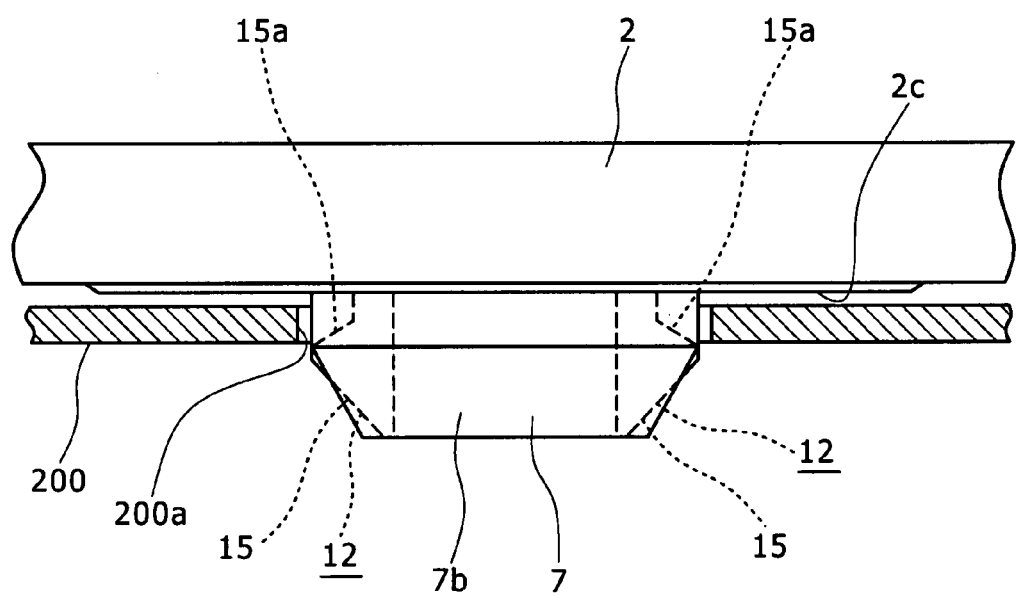
FIG. 10 is a partly sectional side view showing the condition where inserted projection parts are inserted in a center hole of a disk-formed recording medium.
Figure 11:
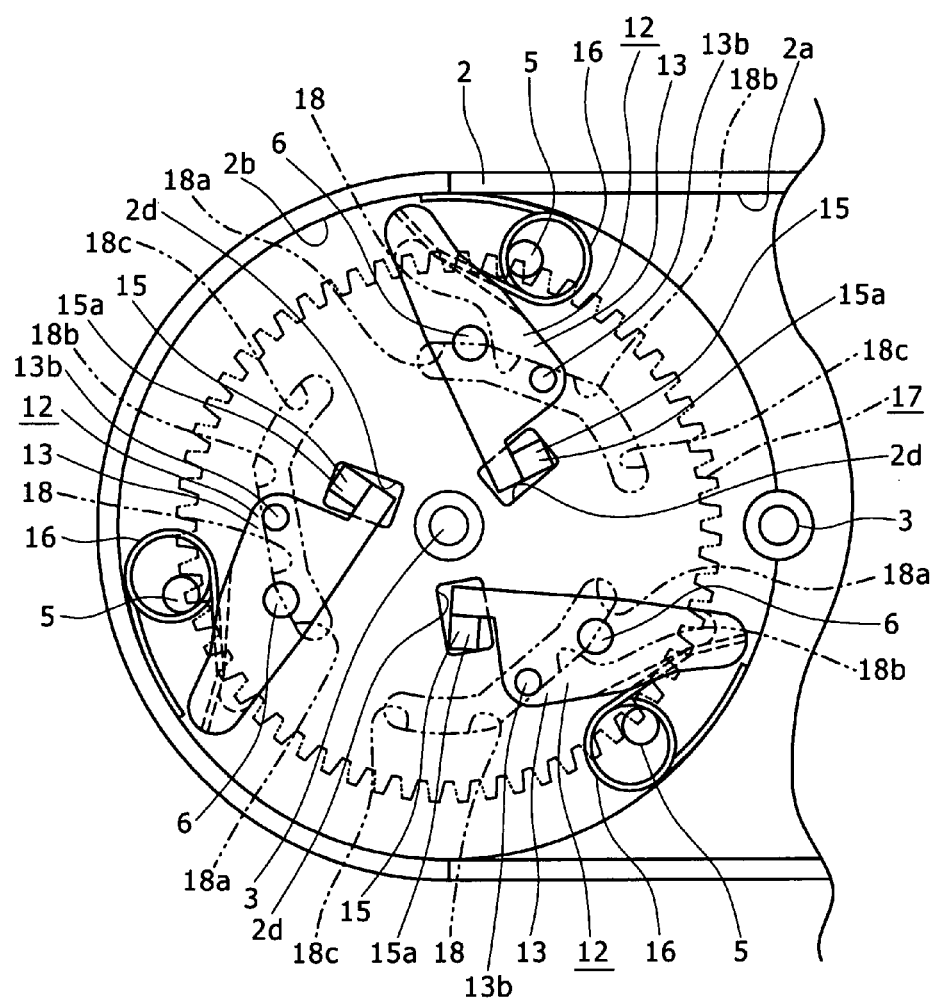
FIG. 11 is an enlarged plan view showing the condition where the disk holding members are in the course of being moved outwards.
Figure 12:
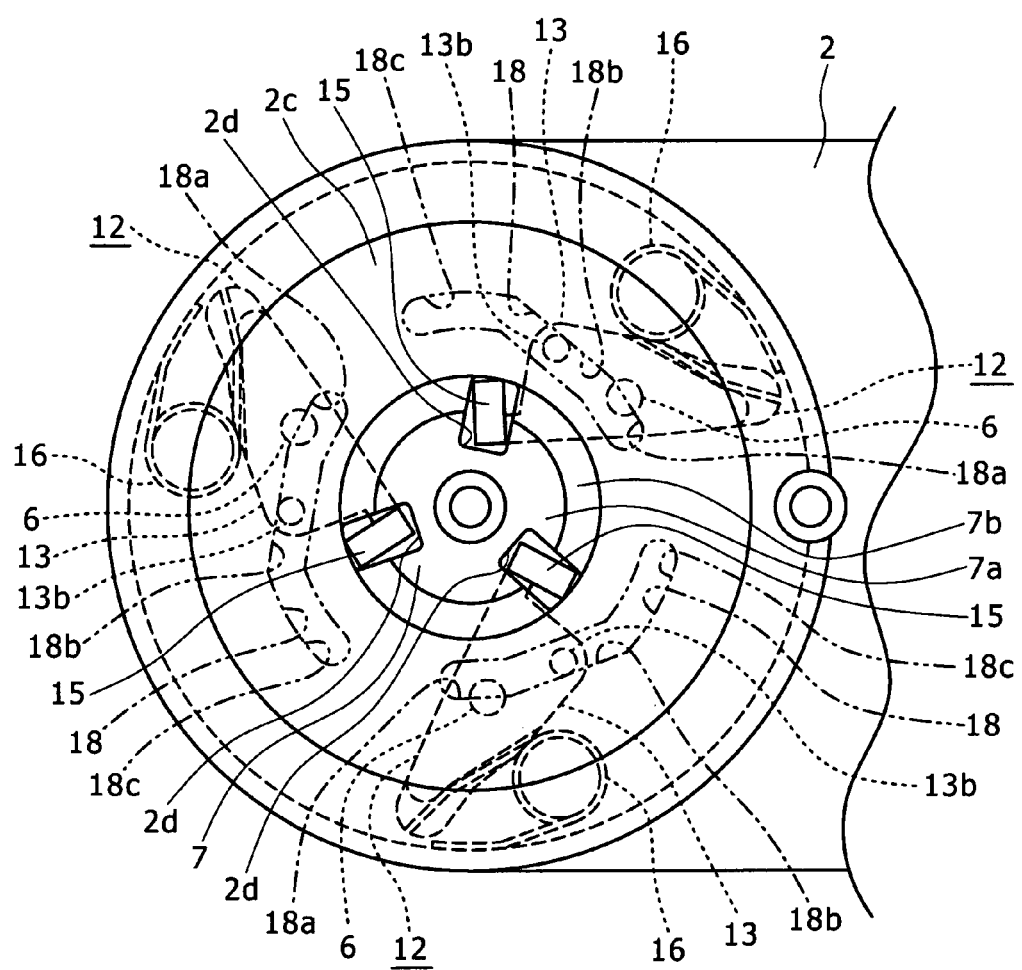
FIG. 12 is an enlarged bottom view showing the condition where the disk holding members are in the course of being moved outwards.

In the condition before the disk holding device 1 holds the disk-formed recording medium 200, the cam shafts 13*b*, 13*b*, 13*b* of the disk holding members 12, 12, 12 are located respectively in the inside non-displaced part 18*a*, 18*a*, 18*a* of the cam grooves 18, 18, 18 in the cam member 17 (see FIG. 8). Therefore, the disk holding members 12, 12, 12 are each located at one movement end in the turning direction thereof, and the holding projection parts 14, 14, 14 are located inside the inserted projection part 7 of the base body 2 (see FIG. 9).

First, the disk holding device 1 is moved, and the inserted projection part 7 is located directly above the center hole 200*a* of the disk-formed recording medium 200. When the inserted projection part 7 is located just above the center hole 200*a* of the disk-formed recording medium 200, the disk holding device 1 is moved downwards, whereby the inserted projection part 7 is inserted into the center hole 200*a* (see FIG. 10). The disk holding device 1 is moved downwards until the lower ends of the inclined surfaces 15*a*, 15*a*, 15*a* of the disk holding members 12, 12, 12 are located below the lower surface of the disk-formed recording medium 200, and, in this condition, the disk-formed recording medium 200 and the lower surface of the disk receiving part 2*c* of the base body 2 are spaced from each other.

Next, the drive motor 8 is rotated in a predetermined direction. When the drive motor 8 is thus rotated, the cam member 17 is rotated, whereby the cam shafts 13*b*, 13*b*, 13*b* of the disk holding members 12, 12, 12 are relatively moved within the cam grooves 18, 18, 18 from the inside non-displaced parts 18*a*, 18*a*, 18*a* toward the displaced parts 18*b*, 18*b*, 18*b*, respectively (see FIGS. 11 and 12).

Figure 13:
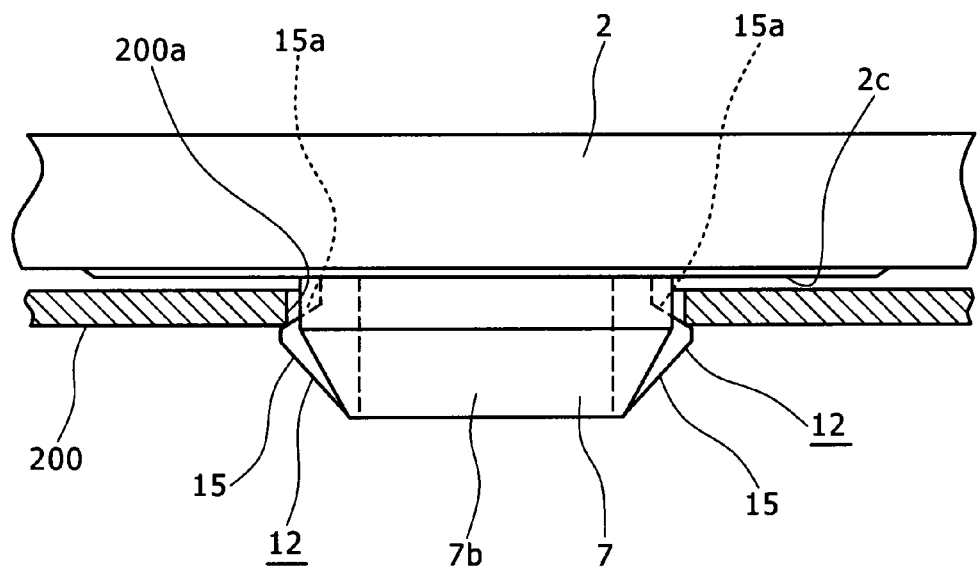
FIG. 13 is a partly sectional side view showing the condition where the disk-formed recording medium is in the course of being lifted up by the disk holding members.

When the cam shafts 13*b*, 13*b*, 13*b* are relatively moved within the displaced parts 18*b*, 18*b*, 18*b*, the disk holding members 12, 12, 12 are turned clockwise as viewed from the upper side, whereby the holding projection parts 14, 14, 14 are gradually projected outwards from the inserted projection part 7 (see FIG. 13). As the holding projection parts 14, 14, 14 are gradually projected outwards from the inserted projection part 7, the inclined surfaces 15*a*, 15*a*, 15*a* are brought into contact with the lower side aperture edge of the center hole 200*a* of the disk-formed recording medium 200, and, thereafter, the disk-formed recording medium 200 is lifted up by the inclined surfaces 15*a*, 15*a*, 15*a* attendant on the turning motions of the disk holding members 12, 12, 12.

Figure 14:
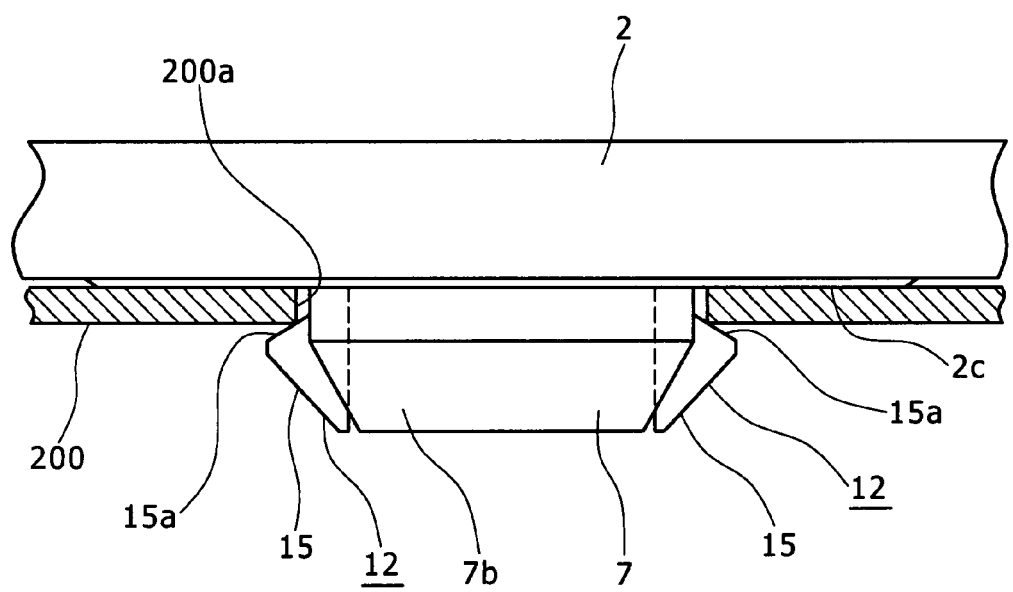
FIG. 14 is a partly sectional side view showing the condition where the disk-formed recording medium is lifted by the disk holding members and the disk-formed recording medium is held.
Figure 15:
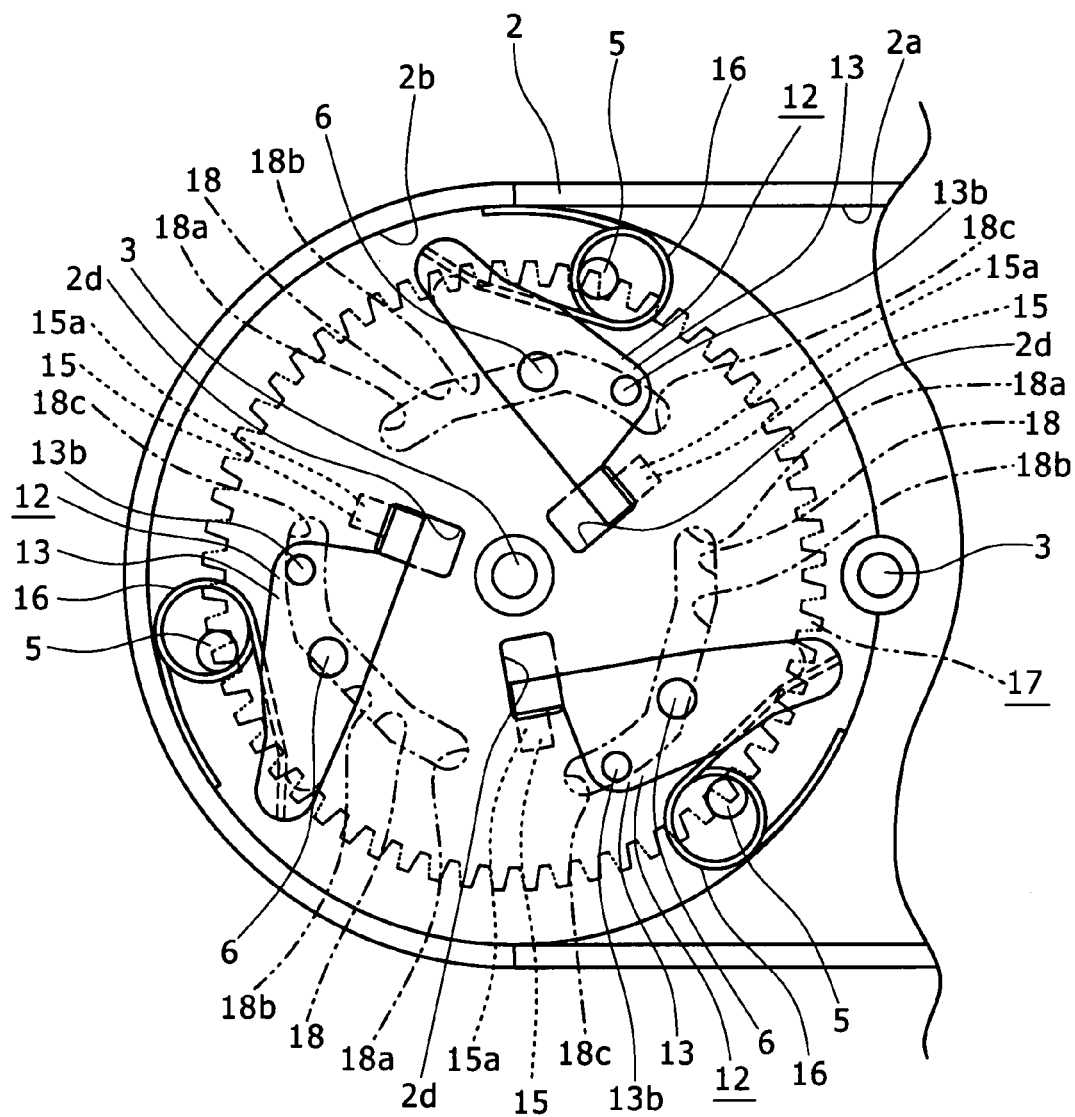
FIG. 15 is an enlarged plan view showing the condition where the disk holding members have been moved outwards.
Figure 16:
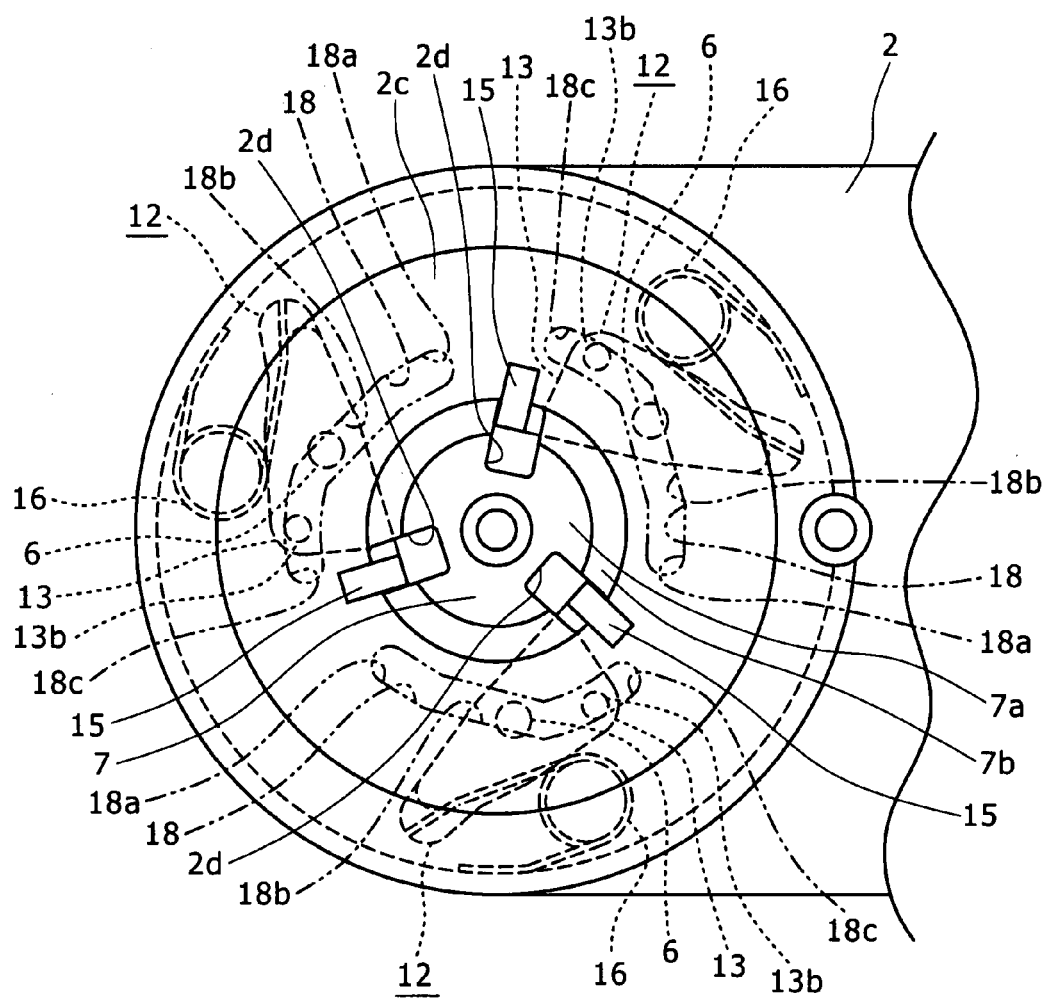
FIG. 16 is an enlarged bottom view showing the condition where the disk holding members have been moved outwards.

When the cam member 17 is rotated further and the disk-formed recording medium 200 is pushed up by the inclined surfaces 15*a*, 15*a*, 15*a* of the disk holding members 12, 12, 12, the upper surface of the disk-formed recording medium 200 is brought into contact with the disk receiving party 2*c* of the base body 2 (see FIG. 14). In this case, the cam shafts 13*b*, 13*b*, 13*b* of the disk holding members 12, 12, 12 are relatively moved respectively from the displaced parts 18*b*, 18*b*, 18*b* to the outside non-displaced parts 18*c*, 18*c*, 18*c* of the cam grooves 18, 18, 18 (see FIGS. 15 and 16), and the turning motions of the disk holding members 12, 12, 12 are stopped.

When the cam shafts 13*b*, 13*b*, 13*b* of the disk holding members 12, 12, 12 are relatively moved to reach the outside non-displaced parts 18*c*, 18*c*, 18*c*, respectively, the rotation of the drive motor 8 is stopped.

The disk-formed recording medium 200 is held in the state of being clamped between the inclined surfaces 15*a*, 15*a*, 15*a* of the disk holding members 12, 12, 12 and the disk receiving part 2*c* (see FIG. 14).

In the disk holding device 1, the disk holding members 12, 12, 12 are being urged counterclockwise as viewed from the upper side by the bias springs 16, 16, 16, as above-mentioned.

Therefore, whenever the cam member 17 is rotated, the cam shafts 13b, 13b, 13b are relatively moved while making contact with the outer edges of the cam grooves 18, 18, 18, respectively, so that the cam shafts 13b, 13b, 13b would not be moved within the cam grooves 18, 18, 18 in the width direction of the latter, and stabilization of the turning motions of the disk holding members 12, 12, 12 is promised.

In addition, in the condition where the upper surface of the disk-formed recording medium 200 is in contact with the disk receiving part 2c, the reaction forces exerted on the holding projection parts 14, 14, 14 from the disk receiving part 2c when the inclined surfaces 15a, 15a, 15a of the holding projection parts 14, 14, 14 press the disk-formed recording medium 200 against the disk receiving part 2c can be absorbed by the bias springs 16, 16, 16, so that dispersions of the positions of the holding projection parts 14, 14, 14 in the radial direction relative to the center of rotation of the disk-formed recording medium 200 can be absorbed, and the dispersion of thickness of the disk-formed recording medium 200 can be absorbed. Therefore, the disk-formed recording medium 200 can be held, without exerting any unnecessary force on the disk-formed recording medium 200.

When the disk-formed recording medium 200 is held by the disk holding device 1 as above-mentioned, the disk holding device 1 is moved in a required direction, and storage of the disk-formed recording medium 200 into a storing part of the stocker 102, mounting of the disk-formed recording medium 200 onto the turntable of the disk drive 103, or the like is performed.

At the time of storing the disk-formed recording medium 200 into the stocker 102 or in the like situation, the holding of the disk-formed recording medium 200 by the disk holding device 1 is canceled. This canceling operation is conducted by a process in which, by an operation reverse to the above-mentioned holding operation, the drive motor 8 is moved in the direction opposite to the above-mentioned direction, and the disk holding members 12, 12, 12 are turned counterclockwise as viewed from the upper side.

The disk holding device 1 is lowered until the lower ends of the inclined surfaces 15a, 15a, 15a of the disk holding members 12, 12, 12 are located below the lower surface of the disk-formed recording medium 200, as above-mentioned. In the disk holding device 1, in order that the lower ends of the inclined surfaces 15a, 15a, 15a are located on the lower surface of the disk-formed recording medium 200 without fail upon the lowering operation irrespectively of the differences in thickness of the disk-formed recording media 200 due to dimensional errors concerning accuracy of processing, differences in the kind of the disk-formed recording media 200, or the like, the following configuration is adopted (see FIGS. 7 and 8).

Figure 17:
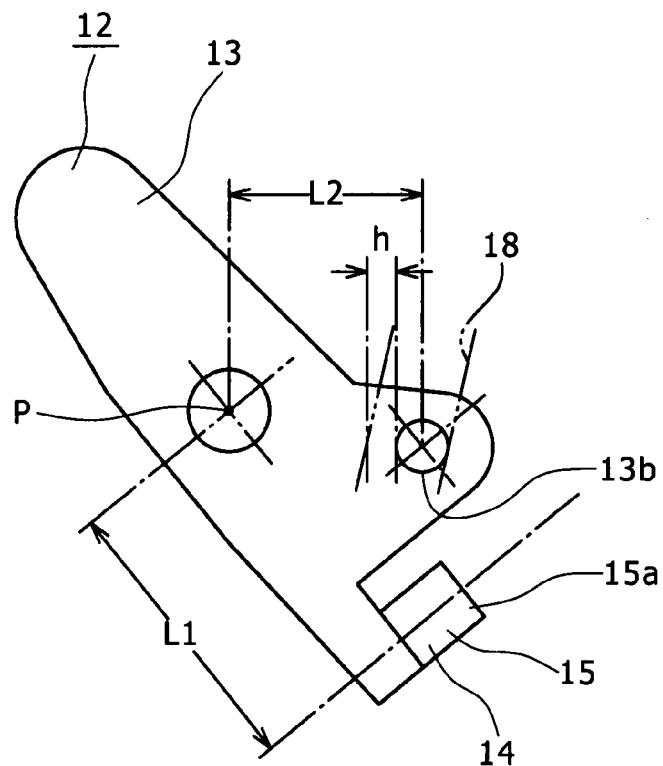
FIG. 17 is a conceptual diagram showing the dimensions of parts such as the disk holding member.

As shown in FIG. 17, the gap between the cam shaft 13b and the cam groove 18 in the width direction of the cam groove 18 is denoted by h, the distance from the center P of turning of the disk holding member 12 relative to the base body 2 to the central part of the holding projection part 14 is denoted by L1, and the distance from the center P of turning of the disk holding member 12 relative to the base body 2 to the center of the cam shaft 13b is denoted by L2.

Figure 18:
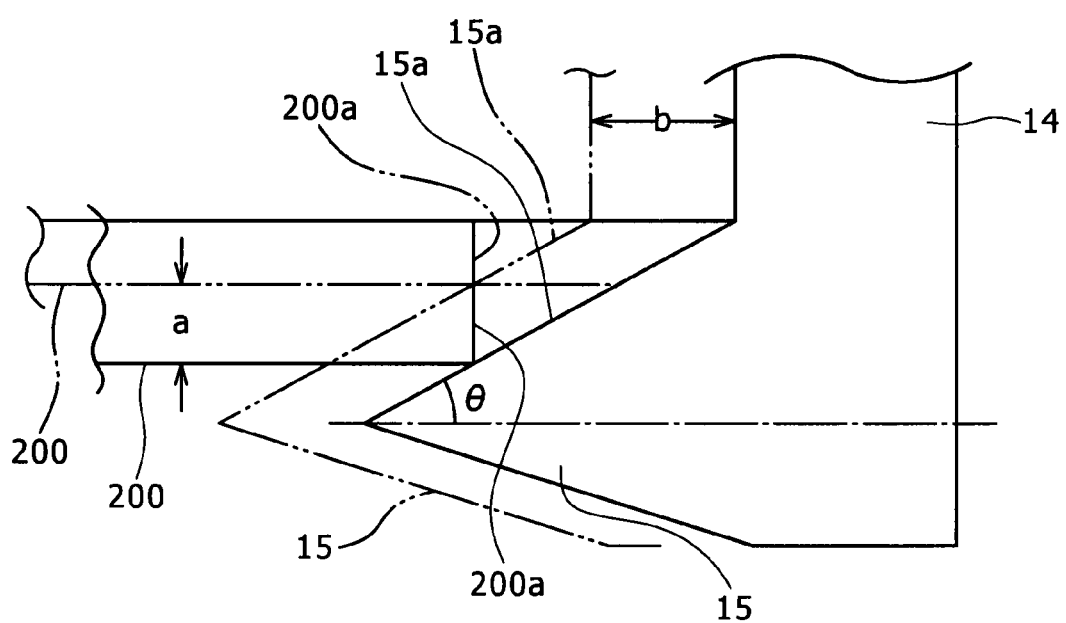
FIG. 18 is a conceptual diagram showing the relationship between the thickness of the disk-formed recording medium and an inclined surface of the disk holding member.

In addition, as shown in FIG. 18, the difference between a maximum size and a minimum size of thickness of the disk-formed recording media 200 due to dimensional errors concerning accuracy of processing is denoted by a, and the inclination angle of the inclined surface 15a of the holding projection part 14 against the recording surface of the disk-formed recording medium 200 is denoted by θ.

Incidentally, although the disk holding members 12, 12, 12 are turned with the spring support shafts 6, 6, 6 as respective fulcrums and the cam shafts 13b, 13b, 13b and the inclined surfaces 15a, 15a, 15a are each moved along an arc, the turning angles in these motions are small. Therefore, the motions of the cam shafts 13b, 13b, 13b and the inclined surfaces 15a, 15a, 15a can be regarded approximately as rectilinear motions. Therefore, calculations in the following Expressions (1) to (3) are carried out by regarding the motions of the cam shafts 13b, 13b, 13b and the inclined surfaces 15a, 15a, 15a as rectilinear motions.

As shown in FIGS. 17 and 18, concerning the disk-formed recording medium 200 having a maximum thickness and the disk-formed recording medium 200 having a minimum thickness, the difference b between the moving distances required for the inclined surface 15a to make contact with the disk-formed recording media 200, 200 when their upper surfaces are set at the same level is considered. The difference b is calculated by the following Expression (1):

$$b = a/\tan\theta \quad (1),$$

and the gap h between the cam shaft 13b and the cam groove 18 required when the difference b is taken into account is calculated by the following Expression (2):

$$h = b(L2/L1) \quad (2).$$

From Expressions (1) and (2), the relationship of:

$$h = (a/\tan\theta)\cdot(L2/L1) \quad (3)$$

is established. The gap h is the distance by which the cam shaft 13b can be moved within the cam groove 18 in the width direction of the cam groove 18.

Where the gap h between the cam shaft 13b and the cam groove 18 is set to a value of not less than $(a/\tan\theta)(L2/L1)$, all disk-formed recording media 200 can be assuredly held by the inclined surfaces 15a, 15a, 15a of the disk holding members 12, 12, 12 and the disk receiving part 2c according to the differences in thickness among the disk-formed recording media 200 due to dimensional errors concerning the accuracy of processing, differences in the type of the disk-formed recording media 200, or the like factors, without exerting any unnecessary load. Therefore, in the disk holding device 1, the values of the relevant dimensions are so determined as to satisfy the relationship of:

$$h \geq (a/\tan\theta)\cdot(L2/L1) \quad (4).$$

To be more specific, in the disk holding device 1, for example, the inclination angle θ of the inclined surface 15a is θ=30°, the distance L1 from the turning center P to the central part of the holding projection part 14 in the horizontal direction is L1=7.50 mm, and the distance L2 from the turning center P to the center of the cam shaft 13b is L2=4.54 mm. Where the difference between the maximum size and the minimum size of the thickness of the disk-formed recording media 200 is a=0.5 mm at maximum, b is determined to be about 0.87 mm from Expression (1), and h is determined to be about 0.53 mm from Expressions (2) and (3). Therefore, it suffices that the gap h between the cam shaft 13b and the cam groove 18 is not less than 0.53 mm. In the disk holding device 1, for an allowance in the value of h, for example, the outside diameter of the cam shaft 13b of the disk holding member 12 is set at 1.4 mm, h=0.6 mm, and the width of the cam groove 18 in the cam member 17 is set at 2.0 mm.

Incidentally, by providing the gap h between the cam shaft 13b and the cam groove 18, all the disk-formed recording media 200 can be assuredly held by the inclined surfaces 15a, 15a, 15a of the disk holding members 12, 12, 12 and the disk receiving part 2c according not only to the differences in thickness among the disk-formed recording media 200 but also to the differences in inside diameter among the disk-formed recording media 200, without exerting any unrequired load.

As has been described above, in the disk holding device 1, the disk-formed recording medium 200 is held by the disk holding members 12, 12, 12 being in contact with the lower side aperture edge of the center hole 200a, and no member makes contact with the inner peripheral surface of the disk-formed recording medium 200, so that marring, wear, damage or the like of the inner peripheral surface of the disk-formed recording medium 200 can be prevented.

In addition, since the disk-formed recording medium 200 is held in the state of being clamped by the inclined surfaces 15a, 15a, 15a of the disk holding members 12, 12, 12 and the disk receiving part 2c, the disk-formed recording medium 200 can be held assuredly.

Incidentally, an example in which three disk holding members 12, 12, 12 are provided has been described above, the number of the disk holding members 12 is not limited to three, and an arbitrary number of disk holding members 12 can be provided insofar as they are arranged in the state of being spaced from each other along the circumferential direction.

Besides, the disk changer in which the disk holding device 1 is used is not limited to the one in which the disk-formed recording medium 200 faces vertically, and a disk changer in which the disk-formed recording medium 200 faces horizontally may also be adopted.

The specific shapes and structures of component parts in the best mode as above-described are mere specific examples in carrying out the present invention, and the technical scope of the invention is not to be construed as limited by the specific examples.

The invention claimed is:

1. A disk holding device comprising:
a plurality of disk holding members to be inserted into a center hole of a disk-formed recording medium and be moved from the inner periphery side toward the outer periphery side of said disk-formed recording medium when inserted in said center hole; and
a disk receiving part for receiving a part, on the outer side of said center hole, of an inner peripheral part of said disk-formed recording medium, wherein
said disk holding members are each provided with a holding projection part projected from the inner periphery side toward the outer periphery side of said disk-formed recording medium;
said holding projection part is provided with an inclined surface displaced so as to be spaced away from said disk-formed recording medium as one goes from the inner periphery side toward the outer periphery side of said disk-formed recording medium in the condition where said disk holding members are inserted in said center hole; and
when said disk holding members are moved from the inner periphery side toward the outer periphery side of said disk-formed recording medium, said inclined surfaces of said holding projection parts make sliding contact with an aperture edge of said center hole to move said disk-formed recording medium in the direction of approaching said disk receiving part, whereby said disk-formed recording medium is held in the state of being clamped between said disk receiving part and said plurality of holding projection parts.

2. The disk holding device as set forth in claim 1, wherein
a base body having said disk receiving part, and
a cam member rotatably supported on said base body and having a plurality of cam grooves, are provided;
said disk holding members are turnably supported on said base body; and
the relationship of $h \geq (a/\tan \theta) \cdot (L2/L1)$ is established, where L1 is the distance from the center of turning of said disk holding member relative to said base body to said holding projection part along the direction orthogonal to the axial direction of the axis of turning of said disk holding member relative to said base body, L2 is the distance from the center of turning of said disk holding member relative to said base body to the center of said cam shaft along the direction orthogonal to the axial direction of the axis of turning of said disk holding member relative to said base body, a is the difference between a maximum size and a minimum size of thickness based on dispersion of the thickness of said disk-formed recording media, θ is the inclination angle of said inclined surface of said holding projection part against a recording surface of disk-formed recording medium, and h is the gap between said cam shaft and said cam groove in the width direction of said cam groove.

3. The disk holding device as set forth in claim 1, wherein
a base body having said disk receiving part, and
a cam member rotatably supported on said base body and having a plurality of cam grooves, are provided;
said disk holding members are each provided with a cam shaft slidably engaged in said cam groove;
said disk holding members are turnably supported on said base body; and
bias springs for urging said cam shafts toward the outer edge side of said cam grooves are provided.

4. A disk recording/reproduction apparatus comprising a disk holding device for holding a disk-formed recording medium and operative to perform recording and/or reproduction of information signals on said disk-formed recording medium, said disk holding device including:
a plurality of disk holding members to be inserted into a center hole of a disk-formed recording medium and be moved from the inner periphery side toward the outer periphery side of said disk-formed recording medium when inserted in said center hole; and
a disk receiving part for receiving a part, on the outer side of said center hole, of an inner peripheral part of said disk-formed recording medium, wherein
said disk holding members are each provided with a holding projection part projected from the inner periphery side toward the outer periphery side of said disk-formed recording medium;
said holding projection part is provided with an inclined surface displaced so as to be spaced away from said disk-formed recording medium as one goes from the inner periphery side toward the outer periphery side of said disk-formed recording medium in the condition where said disk holding members are inserted in said center hole; and
when said disk holding members are moved from the inner periphery side toward the outer periphery side of said disk-formed recording medium, said inclined surfaces of said holding projection parts make sliding contact with an aperture edge of said center hole to move said disk-formed recording medium in the direction of approaching said disk receiving part, whereby said disk-formed recording medium is held in the state of being clamped between said disk receiving part and said plurality of holding projection parts.

* * * * *